United States Patent [19]

Watanabe et al.

[11] 3,882,007

[45] May 6, 1975

[54] PHOTOHARDENABLE FATTY ACID-MODIFIED VINYLATED POLYESTER RESIN COMPOSITION

[75] Inventors: Tadashi Watanabe; Koichiro Murata; Kenjiro Tsubouchi, all of Hiratsuka, Japan

[73] Assignee: Kansai Paint Co., Ltd.

[22] Filed: Nov. 5, 1973

[21] Appl. No.: 412,978

Related U.S. Application Data

[63] Continuation of Ser. No. 221,076, Jan. 26, 1972, abandoned.

[30] Foreign Application Priority Data
Feb. 1, 1971  Japan.................................. 46-3322

[52] U.S. Cl....... 204/159.15; 117/93.31; 117/132 B; 204/159.16; 204/159.19; 260/22 CB; 260/22 TN; 260/22 CA; 260/836; 260/859 R
[51] Int. Cl. ....... B01d 1/10; B01d 1/12; C08d 1/00
[58] Field of Search .................. 260/22 TN, 22 CB; 204/159.15, 159.16, 159.19

[56] References Cited
UNITED STATES PATENTS

| | | | |
|---|---|---|---|
| 3,382,297 | 5/1968 | Thompson | 260/885 |
| 3,509,234 | 4/1970 | Burland et al. | 260/22 TN |
| 3,673,140 | 6/1972 | Ackerman et al. | 260/22 TN |
| 3,723,370 | 3/1973 | Watanabe et al. | 260/22 TN |
| 3,752,778 | 8/1973 | Dhein et al. | 260/22 TN |
| 3,772,171 | 11/1973 | Savageau et al. | 204/159.19 |

*Primary Examiner*—John C. Bleutge
*Assistant Examiner*—Richard B. Turer
*Attorney, Agent, or Firm*—Ostralenk, Faber, Gerb & Soffen

[57] ABSTRACT

Photohardenable fatty acid-modified vinylated polyester resin composition essentially consisting of a vinyl monomer, a photosensitizer and a fatty acid-modified vinylated polyester resin which is prepared by reacting an addition product obtained by a reaction between a diisocyanate compound and a vinyl monomer having a hydroxyl group with free hydroxyl groups present in the skeletal structure of a saturated or unsaturated polyester resin modified with fatty acids consisting of drying oil, semi-drying oil or a mixture thereof.

8 Claims, No Drawings

PHOTOHARDENABLE FATTY ACID-MODIFIED VINYLATED POLYESTER RESIN COMPOSITION

This is a continuation of application Ser. No. 221,076 filed on Jan. 26, 1972, now abandoned.

This invention relates to a photohardenable fatty acid-modified vinylated polyester resin composition which has excellent surface and internal hardening properties and other advantageous properties which essentially consists of a vinyl monomer, a photosensitizer and a fatty acid-modified vinylated polyester resin which is prepared by reacting an addition product obtained by a reaction between a diisocyanate compound and a vinyl monomer having a hydroxyl group with free hydroxyl groups present in the skeletal structure of saturated or unsaturated polyester resin modified with fatty acids consisting of a drying oil, semi-drying oil or a mixture thereof.

Heretofore, a vinylated polyester resin useful in such a photohardenable composition has been well known. Said vinylated polyester resin is obtained by reacting a first isocyanate group of diisocyanate compounds with hydroxyl groups present in the skeletal structure of a saturated or unsaturated polyester resin to provide an isocyanate terminated polyester resin, and subsequently reacting the remaining isocyanate groups present in the isocyanate terminated polyester resin with hydroxyl groups of hydroxy alkyl acrylate or hydroxy alkyl methacrylate. The photohardenable composition in which the vinylated polyester resin thus obtained is used has, however, a drawback in that the hardening reaction at the surface is inhibited or retarded by oxygen in the air at the surface in contact therewith. In order to improve the surface hardening property, the the wax or paraffin is added to the composition thereby forming a thin wax or paraffin layer on the surface of the composition and protecting said surface from the oxygen. Such a composition containing a wax or paraffin has, however, the drawbacks not only of requiring considerable labor and time in additional treatments such as surface polishing or buffing after hardening with light irradiation necessary to remove the wax or paraffin layer on the surface and also to correct the inferior surface smoothness, but also of necessitating the use of a light source of limited heat generation or the use of a heat absorbing filter to form the uniform wax or paraffin layer.

Moreover, when the vinylated polyester resin is prepared by using a diisocyanate compound, e.g., hexamethylene diisocyanate, xylylene diisocyanate etc., as the diisocyanate component, in which the two isocyanate groups have at the same or nearly the same reactivity, a greater amount of resin to resin cross-linking will occur. Therefore, such a diisocyanate compound must be used as a mixture with another diisocyanate compound, e.g. tolylene diisocyanate, in which one of the two isocyanate groups reacts with hydroxyl group at a much greater rate than does its companion. The vinylated polyester resin which is prepared by using an aliphatic diisocyanate compound or an aromatic diisocyanate compound having two isocyanate groups indirectly combined to aromatic nucleus and having the same or nearly the same reactivity of two isocyanate groups in the diisocyanate compound is relatively good in its surface hardening property and in nonthixotropy of said polyester resin compared with a vinylated polyester resin which is prepared by using a diisocyanate compound having two isocyanate groups directly combined to aromatic nucleus and having a different reactivity between the two isocyanate groups. The vinylated polyester resin obtained by process of the prior art is still inferior in surface hardening property.

Therefore, the principal object of the present invention is to provide a photohardenable vinylated polyester resin composition having an excellent surface hardening property which is not inhibited by oxygen in the air even in the absence of wax or paraffin layer.

Another object of the present invention is to provide a photohardenable vinylated polyester resin composition obtained by using a vinylated polyester resin in which an olefinic carbon to carbon unsaturation has not almost selectivity to vinyl monomer for crosslinking reaction although commercial unsaturated polyesters pose a limitation on the usable vinyl monomers depending on the species of unsaturated dibasic acid employed in said unsaturated polyester resin.

This invention relates to a novel photohardenable fatty acid-modified vinylated polyester resin composition which has excellent surface and interior hardening properties, adhesion, bending property, anticorrosiveness, chemical resistance, physical properties, water resistance, weathering property etc. free from the above-mentioned drawbacks.

More particularly, this invention relates to a photohardenable fatty acid-modified vinylated polyester resin composition comprising A. from about 10 to about 60 percent by weight of a vinyl monomer, vinylidene monomer or a mixture thereof.

B. from about 40 to about 90 percent by weight of a fatty acid-modified vinylated polyester resin prepared by reacting 1.0 mole of diisocyanate compound with 0.7 to 1.3 moles of vinyl or vinylidene monomer having a hydroxyl group to provide an isocyanate-terminated adduct, and then 2. reacting 0.4 to 1.2 moles of said isocyanate adduct per 1.0 mole of a pendant hydroxyl of a fatty acid-modified polyester resin to obtain said fatty acid-modified vinylated polyester resin having from 0.2 to 3.0 $\alpha$, $\beta$-olefinic unsaturation units per 1000 units molecular weight of said resin, in which said fatty acid-modified polyester resin has a number average molecular weight of about 800 to about 5,000, a fatty acid content of about 5 to 35 percent by weight based on a total weight of the fatty acid and unmodified polyester resin, a number of hydroxyl groups of about 0.5 to 3.0 units per 1000 units molecular weight and an acid value of about 5 to about 30, C. metal salt dryer selected from cobalt, manganese, calcium, zinc, iron, zirconium, celium or copper salt in amount of about 0.1 to 2.0 percent by weight based on the total amount of the fatty acid-modified vinylated polyester resin and vinyl monomer, and D. a photosensitizer in an amount of about 0.05 to about 10 percent by weight based on the total amount of the fatty acid-modified vinylated polyester resin and vinyl monomer, in which said photosensitizer is one selected from the group consisting of the following general formulas:

1 benzoin and its derivatives

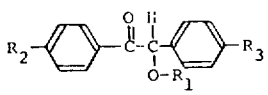

in which $R_1$ is hydrogen, alkyl group having from one to 18 carbon atoms, methylcyclohexyl group, benzyl group or ethylether derivative groups represented by the general formula

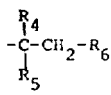

in which $R_4$ or $R_5$ is hydrogen or methyl group and $R_6$ is alkoxy group having one to four carbon atoms, acetyl group having one to four carbon atoms or alkoxyalkyl group having one to six carbon atoms, 2. azo compounds

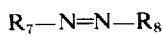

in which $R_7$ is

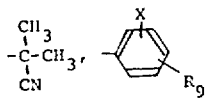

($R_9$ is hydrogen, chlorine or alkyl group having one to three carbon atoms and x is hydrogen, chlorine or bromine),

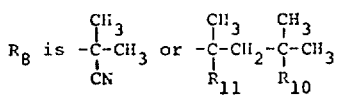

($R_{10}$ is hydrogen, methyl group or methoxy group, and $R_{11}$ is hydrogen or nitrile group), and 3. diphenyl disulfide and its derivatives

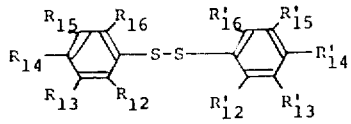

in which $R_{12}$ and $R'_{12}$ are hydrogen, methyl group or chlorine, $R_{13}$ and $R'_{13}$ are hydrogen or methyl group, $R_{14}$ and $R'_{14}$ are hydrogen, chlorine, alkyl group having one to four carbon atoms or methoxy group, $R_{15}$ and $R'_{15}$ are hydrogen, chlorine or methyl group, and $R_{16}$ and $R'_{16}$ are hydrogen or methyl group.

The fatty acid-modified polyester resin used as a starting resin is an alkyd type polyester which may or may not have olefinic carbon to carbon unsaturation. Said essential components will respectively be described detailedly in the following.

I. Fatty acid-modified vinylated polyester resin

The fatty acid-modified vinylated polyester resins for use in the present invention can be obtained by reacting the isocynate-terminated adduct with hydroxyl groups remaining in the fatty acid-modified polyester resins.

The fatty acid-modified polyester resin can be obtained by condensation of polyhydric alcohols with acid components consisting of unsaturated dibasic acids and/or anhydrides thereof or a mixture thereof with saturated dibasic acids and/or anhydrides thereof, and fatty acids of drying all semi-drying oil or a mixture thereof. The condensation reaction and the fatty acid-modification in this case can be carried out in the conventional process. Also, the suitable ratio of polyhydric alcohol components to the acid components except fatty acids is within a range of 1.02 to 1.20 moles per mole of acid components, and the fatty acid-modified polyester resin is advantageously made to contain hydroxyl groups of 0.5 to 3.0 units per 1,000 units molecular weight. The preferable extent of the amount of fatty acid is within a range of 5 to 35 weight percent based on the total weight of the fatty acid and unmodified polyester resin. The polyester resin modified by fatty acid is especially improved in its surface hardening property because the double bonds in fatty acid are of the oxidation polymerization type. Additionally the effect of the present invention is most markedly realized by employing so-called fatty acid-modified saturated polyester resin utilizing solely saturated dibasic acids and/or anhydrides thereof as the acid components except fatty acid, but it is also realizable with unsaturated dibasic acids alone or a mixture thereof with saturated dibasic acids. In such case, the particularly preferable composition of acid components consists of 100 to 10 mol percent of the saturated dibasic acids and/or anhydrides thereof and not more than 90 mol percent of unsaturated dibasic acids and/or anhydrides thereof. Dihydric alcohols and polyhydric alcohols can be used but, more preferably, a mixture of dihydric alcohols and polyhydric alcohols containing at least three hydroxyl groups in a molecule is employed. The most preferable composition of dihydric and polyhydric alcohols is from 80 to 20 mol percent of the former and 20 to 80 mol percent of the latter. The saturated dibasic acids, unsaturated dibasic acids and anhydrides thereof, polyhydric alcohols and fatty acids to be employed in the present invention can be those ordinarily utilized in the fields of related art. In the above-mentioned reaction system, it is furthermore possible to employ a polymerization inhibitor, if necessary, of the species and amount commonly utilized in the related art.

The isocyante-terminated adduct to be employed in the present invention is obtained by a reaction between a diisocyanate compound and a vinyl or vinylidene monomer having a hydroxyl group (hereinafter referred to as "vinyl monomer having a hydroxyl group"), theoretically in an equimolar addition reaction. Thus, said isocyanate-terminated adduct for use in the present invention can be obtained by adding one molecule of vinyl monomer having a hydroxyl group to 1 mole of the diisocyanate compound having two isocyanate groups. When an excess of vinyl monomer having a hydroxyl group is used, the isocyanate group reacting with the pendant hydroxyl groups of the fatty acid-modified polyester resin is decreased and it is almost impossible to achieve the object of the present invention. On the other hand, an amount of said vinyl monomer having a hydroxyl group less than said equimolar amount will leave unreacted diisocyanate compound in the system. Consequently, the isocyanate adduct adapted for use in the composition according to the present invention can be obtained by employing vinyl monomer having a hydroxyl group in an amount within a range of 0.7 to 1.3 moles, preferably in an amount of 1 mol with respect to 1 mol of said diisocyanate compound. A ratio outside said range will eventually lead to various drawbacks such as deteriorated storage stability or turbidity in the composition due to the above-mentioned reasons.

The reaction between the diisocyanate compound and a vinyl monomer having a hydroxyl group is preferably carried out within a temperature range of about 20° to about 110° C. Because this reaction is exothermic, and effective cooling process is required when both reagents are charged entirely at one time, but the reaction can be more easily carried out by heating said diisocyanate compound to the desirable temperature and then gradually adding a vinyl monomer having a hydroxyl group dropwise. More specifically, said reaction is carried out by heating said diisocyanate compound to a temperature within a range of about 20° to about 110° C, preferably 60° to 80° C, and adding said vinyl monomer having a hydroxyl group over a period of about 1 to about 5 hours, preferably 2 to 3 hours. The reaction is further continued for about 1 to about 5 hours at the same temperature after completely adding said vinyl monomer having hydroxyl group. In case of employing diisocyanate of relatively low reactivity of isocyanate groups such as hexamethylene diisocyanate or xylene diisocyanate in this reaction, it is possible, in order to shorten the reaction period, to add a catalyst in an amount of about 1.0 to about 0.01 weight percent based on the total amount of said diisocyanate compound. A reaction temperature exceeding 110° C may result in undesirable side-reactions, particularly if the catalyst is employed. Because of the exothermic nature of the reaction as explained before, sufficient attention should be paid to the control of temperature in the course of said reaction. The termination of the reaction in this system is determined by measuring an isocyanate value. The theoretical end point of the reaction is reached when the vinyl monomer having a hydroxyl group added to the system is entirely reacted in an equimolar reaction with the diisocyanate compound.

Furthermore, when said reaction is to be carried out at an elevated temperature or for a prolonged period, it is possible to use a polymerization inhibitor in order to prevent the possible polymerization of said vinyl monomers having a hydroxyl group.

The diisocyanate compounds used for obtaining the fatty acid-modified vinylated polyester resin of the present invention are 2,4-tolylene diisocyanate, 2,6-tolylene diisocyanate 1,6-hexamethylene diisocyanate, 4,4'-diphenylmethane diisocyanate, 4,4'-diphenylether diisocyanate, m-phenylene diisocyanate, 1,5-naphthalene diisocyanate, biphenylene diisocyanate, 3,3'-dimethyl-4,4'-biphenylene diisocyanate, dicylohexylmethane-4,4'-diisocyanate, p-xylylene diisocyanate, m-xylylene diisocyanate, bis(4-isocyanate phenyl)sulfone, isopropylydene-bis(4-phenylisocyanate) etc. and the mixtures thereof. Of these diisocyanate compounds, it is particularly preferable to employ the aliphatic diisocyanate compound, e.g. hexamethylene diisocyanate or an aromatic diisocyante compound, e.g. xylylene diisocyanate, having two isocyanate groups indirectly combined to aromatic nucleus and having the same or nearly the same reactivity as the diisocyanate compound for the invention.

The vinyl monomer having a hydroxyl group used for obtaining the isocyanate-terminated adduct in the present invention are 2-hydroxyethyl methacrylate, 2-hydroxypropyl methacrylate, 2-hydroxyethyl acrylate, 2-hydroxypropyl acrylate, allyl alcohol, methallyl alcohol etc. and the mixtures thereof.

Examples of catalyst employable in case the reaction is to be accelerated are dibutyl tin dilaurate, dibutyl tin oxide, triethylamine etc. Examples of polymerization inhibitor employable in the present invention are hydroquinone, 2,6-di-tert-butyl hydroxytoluene, parabenzoquinone etc. An amount of the initiator is in the range of about 300 ppm to about 600 ppm of the amount of vinyl monomer having a hydroxyl group used for providing the isocyanate-terminated adduct.

Fatty acid-modified vinylated polyester resin for the present invention can be obtained by reacting the fatty acid-modified polyester resin prepared as explained above with the isocyanate-terminated adduct.

More specifically, the fatty acid-modified vinylated polyester resin for the present invention can be obtained by reacting from 0.4 to 1.2 moles of said isocyanate-terminated adduct per 1 mole of the pendant hydroxyl groups of said fatty acid-modified polyester resin at a temperature within a range of about 20° to about 110° C, preferably 60° to 80° C for a period of about 0.5 to about 5 hours, preferably 1 to 5 hours. Consequently, the fatty acid-modified vinylated polyester resin thus prepared will contain from 0.2 to 3.0 of $\alpha, \beta$-olefinic unsaturation units per 1,000 units molecular weight of said resin.

Furthermore, it is possible to add the aforementioned polymerization inhibitor to the system when the reaction thereof is to be carried out at an elevated temperature or for a prolonged period.

The fatty acid-modified vinylated polyester resin obtained by the reaction between fatty acid-modified polyester resin and isocyanate-terminated adduct cannot be provided with advantageous properties when the amount of said isocyanate-terminated is less than 0.2 mol per 1 mol of the pendant hydroxyl groups of said fatty acid-modified polyester resin, while an amount of said isocyanate-terminated adduct used in excess of 1.2 moles will not only leave the unreacted isocyanate-terminated adduct which will eventually be wasted but also lead to the increase in the thixotropic property of the reaction product and the possible increase in toxicity due to remaining isocyanate groups.

In order to reduce the increase in the viscosity during the course of said reaction, an inert solvent to said isocyanate groups such as esters, ketones, hydrocarbons etc. can be generally used, but for achieving the objects of this invention, it is particularly preferable to employ the vinyl monomers inert to isocyanate group, such as ethyl acrylate, methyl methacrylate or styrene. If necessary, said vinyl monomers inert to isocyanate groups are used in combination with suitable polymerization inhibitor. Eventual presence of the unreacted diisocyanate compound or the isocyanate-terminated adduct in the reaction produce may lead to various troubles such as deteriorated storage stability or transparency of the reaction product, and it is therefore recommended, in order to prevent such troubles, to remove such diisocyanate compound or isocyanate-terminated adduct by means of adding aforementioned vinyl monomer having a hydroxyl group to the reaction product and effecting the reaction under conditions explained before. Thus it is possible to obtain fatty acid-modified vinylated polyester resin for use in this invention.

The isocyanate-terminated adduct for use in the present invention can be obtained by reacting a diisocyanate compound with a vinyl monomer having a hydroxyl group as explained.

II. Vinyl or vinylidene monomer

The vinyl or vinylidene monomer (hereinafter referred to as "vinyl monomer") to be employed in the present invention for solubilizing fatty acid-modified vinylated polyester resin and causing the crosslinking reaction of said resin can be any vinyl monomers employed in the prior art for solubilizing and crosslinking unsaturated polyester resin.

These vinyl monomers or vinylidene monomers are, for example, represented by the following three general formulas:

1. styrene and its derivatives

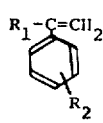

in which $R_1$ is hydrogen or methyl group and $R_2$ is hydrogen, methyl group or chlorine.

2. acrylic or methacrylic monomers

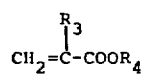

in which $R_3$ is hydrogen or methyl group and $R_4$ is hydrogen, alkyl group having one to 16 carbon atoms, hydroxyalkyl group having two to three carbon atoms, glycidyl group and dialkylamino alkyl group

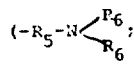

$R_5$ is alkylene group having one to two carbon atoms and $R_6$ is alkyl group having one to two carbon atoms) and 3. vinylidene compounds

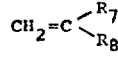

in which $R_7$ is hydrogen or methyl group and $R_8$ is nitrile group, carbamoyl group, N-methylolcarbamoyl group alkylether-N-methylolcarbamoyl group ($-CONHCH_2OR_9$; $R_9$ is alkyl group having one to four carbon atoms) or acetoxy group.

Examples of vinyl monomers (1) are styrene, vinyl toluene, 2-methyl styrene and chlorostyrene.

Examples of vinyl monomers (2) are acrylic acid, methacrylic acid, methyl acrylate, methyl methacrylate, butyl acrylate, butyl methacrylate, 2-ethyl hexyl acrylate, 2-ethyl hexyl methacrylate, octyl acrylate, octyl methacrylate, lauryl methacrylate, 2-hydroxyethyl acrylate, 2-hydroxyethyl methacrylate, 2-hydroxypropyl acrylate, 2-hydroxypropyl methacrylate, glycidyl acrylate, glycidyl methacrylate, dimethylaminomethyl acrylate, dimethylaminoethyl methacrylate, diethylaminoethyl acrylate, and diethylaminoethyl methacrylate.

Examples of vinyl monomers (3) are acrylonitrile, methacrylonitrile, acrylamide, methacrylamide, ethylether-N-methylol acrylamide, ethylether-N-methyl methacrylamide, butyl-N-methylol acrylamide, propyl-N-methylol methacrylamide and vinyl acetate.

These vinyl monomers may be used independently or a mixture of two or more compounds. The amount of said vinyl monomers to be used varies depending upon the purpose required, but is preferably within a range of 10 to 60 weight percent, and the amount of the fatty acid-modified vinylated polyester resin is preferably within a range of 90 to 40 weight percent. In this case, an amount of said vinyl monomers less than 10 weight percent is practically unfavorable since the hardening by light irradiation not only is extremely slow but also leads only to an insufficient mechanical strength while an amount in excess of 60 weight percent is also undesirable because of deteriorated mechanical strength and solvent resistance after hardening.

III. Photosensitizer

The photosensitizer is employed in the present invention.

These photosensitizers are, for example, represented by the following general formulas:

1. Benzoin and its derivatives

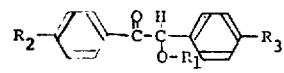

in which $R_1$ is hydrogen, alkyl group having from 1 to 18 carbon atoms, ethyl ether derivatives

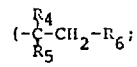

$R_4$ and $R_5$ are hydrogen or methyl group, $R_6$ is alkoxy group or acetyl group having from one to four carbon atoms, or alkoxyalkyl group having from one to six carbon atoms), methylcyclohexyl group or benzyl group, and $R_2$ is hydrogen, methoxy group or dimethyl amino group, and $R_3$ is hydrogen or methoxy group.

Examples of general formula (1) are benzoin, benzoin methyl ether, benzoin ethyl ether, benzoin isopropyl ether, benzoin butyl ether, benzoin 2-ethyl hexyl ether, benzoin n-octyl ether, benzoin iso-octyl ether, benzoin n-nonyl ether, benzoin n-decyl ether, benzoin lauryl ether, benzoin cetyl ether, benzoin 2-methyl cyclohexyl ether, benzoin-benzyl ether, 4-methoxy benzoin, 4-dimethylamino benzoin, anisoin, anisoin methyl ether, ansoin ethyl ether, anisoin iso-propyl ether, 4-methoxy benzoin methyl ether, 4-methoxy benzoin ethyl ether, 4-methoxy benzoin isopropyl ether, 4-dimethyl amino benzoin methyl ether, 4-dimethyl amino benzoin ethyl ether, 4-dimethyl amino benzoin isopropyl ether, benzoin-2-methoxy ethyl ether, benzoin-2-ethoxy ethyl ether, benzoin-2-(2-ethoxy) ethoxy ethyl, benzoin dimethyl acetyl methyl ether, benzoin-2-(2-methoxy ethoxy) ethyl ether and benzoin-2-(2-buthoxy ethoxy)-ethyl ether.

2. Azo compounds $$R_7-N=N-R_8$$

in which $R_7$ is

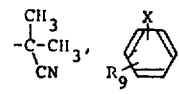

(X is hydrogen, chlorine atom or bromine atom, and $R_9$ is hydrogen, chlorine atom or alkyl group having one to three carbon atoms), $R_8$ is

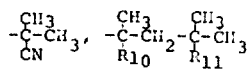

($R_{10}$ is hydrogen, methyl group or methoxy group, and $R_{11}$ is hydrogen or nitrile group).

Examples of general formula (2) are 2,2-azobisisobutylonitrile, 2-phenylazo-2,4,4-trimethyl valeronitrile, 2-phenylazo-2,4-dimethyl valeronitrile, 2-phenylazo-2,4-dimethyl-4-methoxy valeronitrile, 2-(tolylazo)-2,4-dimethyl valeronitrile, 2-(octyl phenylazo)-2,4-dimethyl valeronitrile 2-(chloro phenylazo)-2,4-dimethyl valeronitrile, 2-(dichlorophenylazo)-2,4-dimethyl valeronitrile, 2-(ethyl monochlorophenyl)-2,4-dimethyl valeronitrlle, 2-(hexyl monobromo phenylazo)-2, 4-dimethyl valerontrile, 2-(phenylazo)-2,4-dimethyl-4-methoxy valeronitrile, 2-(tolylazo)-2,4-dimethyl-4-methoxy valeronitrile, 2-(hexyl phenylazo)-2,4-dimethyl-4-methoxy valeronitrile, 2-(heptyl phenylazo)-2,4-dimethyl-4-methoxy valeronitrile, 2-(menochlorophenylazo)-2,4-dimethyl-4-methoxy valeronitrile, 2-(dichlorophenylazo)-2,4-dimethyl-4-methoxy valeronitrile, 2-(hexyl monobromophenylazo)-2,4-dimethyl-4-methoxy valeronitrile, 2-(phenylazo)-2,4-dimethyl-4-propoxy valeronitrile, 2-(phenylazo)-2,4-dimethyl-4-butoxy valeronitrile, 2-(chlorophenylazo)-2,4-dimethyl-4-butoxy valeronitrile, 2-(tolylazo)-2,4-dimethyl-4-butoxy valeronitrile, 2-(hexylphenylazo)-2,4-dimethyl-4-butoxy valeronitrile, 2-(dichlorophenylazo)-2,4-dimethyl-4-butoxy valeronitrile and 2-(propylmonochlorophenylazo)-2,4-dimethyl-4-butoxy valeronitrile.

3. Diphenyl disulfide and its derivatives

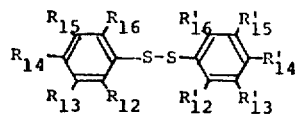

in which $R_{12}$ and $R_{12}'$ are hydrogen, methyl group or chlorine atom, $R_{13}$ and $R_{13}'$ are hydrogen or methyl group, $R_{14}$ and $R_{14}'$ are hydrogen, alkyl group having one to four carbon atoms, chlorine atom or methoxy group, $R_{15}$ and $R_{15}'$ are hydrogen, methyl group or chlorine atom, and $R_{16}$ and $R_{16}'$ are hydrogen or methyl group.

Examples of general formula (3) are diphenyl disulfide, 4,4'-dimethyl diphenyl disulfide, 2,2',5,5'-tetramethyl diphenyl disulfide, 2,2',4,4'-tetramethyl diphenyl disulfide, 3,3',4,4'-tetramethyl diphenyl disulfide, 4,4-di-tert-butyl diphenyl disulfide, 2,2',6,6'-tetramethyl-4,4'-di-tert-butyldiphenyl disulfide, 4,4'-dichloro-diphenyl disulfide, 2,2',4,4', 5,5'-hexachloro-diphenyl disulfide and 4,4'-dimethoxy-diphenyl disulfide.

These may be employed independently or as a mixture of two or more compounds. Such photosensitizer is used in an amount within a range of about 0.05 to about 10 weight percent based on the total amount of fatty acid-modified vinylated polyester resin and vinyl monomers. An amount less than said range is practically unfavorable because of slow crosslinking reaction whereas an amount in excess of about 10 weight percent not only is uneconomical because the photosensitizing effect no longer increases beyond a certain limit but also is unfavorable because of deteriorated mechanical strength of film after hardening.

IV. Metal salt dryer

Since metal salt dryer is used in the photohardenable fatty acid-modified vinylated polyester resin composition of the present invention, the surface hardening property is further improved. The metal salt dryer is one or more than two compounds selected from a group consisting of metal salt dryers including cobalt, lead, manganese, calcium, zinc, iron, zirconium, celium or copper salt of naphthanic acid, octoinic acid, linseed oil fatty acid, soybean oil fatty acid and tor oil fatty acid in an amount of 0.1 to 2.0 weight percent as metal based on the total amount of the fatty acid-modified vinylated polyester resin and vinyl monomers. An amount less than said range is practically unfavorable because of slow crosslinking reaction and low surface hardening. An amount of addition of said metal salt dryer in excess of 2.0 weight percent as metal will lead to the deterioration of storage stability of ore obtained composition and of mechanical strength after hardening.

Also well-known polymerization inhibitors can be utilized in order to stabilize the composition according to the present invention during the storage thereof. Said polymerization inhibitor can be added either simultaneously at the mixing of the components of the composition according to the present invention or to said components prior to said mixing. Examples of polymerization inhibitors applicable in the present invention are hydroquinone, mono-tert-butylcatechol, 2,5-di-tert-budylhydroquinone, benzoquinone, 2,6-di-tert-butylhydroxytoluene, 2,5-diphenyl-p-benzoquinone, picric acid, di-p-fluorophenylamide etc. Said polymerization inhibitors are added in order to prevent thermal polymerization alone without affecting photohardening reaction. Consequently, the amount of said inhibitors to be added is preferred not to exceed 500 ppm based on the total amount of fatty acid-modified vinylated polyester resin and vinyl monomers.

The light source to be employed in order to harden the composition according to the present invention can be solar light, low-pressure mercury lamp, medium-pressure mercury lamp, high-pressure mercury lamp, ultra high-pressure mercury lamp, arc light, xenon lamp, incandescent lamp etc., though this depends on the sensitizing wavelength range specific to the photosensitizer to be employed.

The hardening reaction of the photohardenable composition proceeds by the generation of free initiator radicals by said photosensitizer upon absorption of light and successive crosslinking reaction by means of polymerization between vinyl monomers and unsaturated contained in the skeletal structure of the fatty acid-modified vinylated polyester resin initiated by said free radicals. Consequently, the principal factors contributing to the hardenability are the amount and reactivity of the polymerizable unsaturations contained in the skeletal structure of the fatty acid-modified vinylated polyester resin. In the photohardenable composition of this invention, the introduction of polymerizable unsaturations is realized by means of isocyanate terminated adduct or a mixture thereof with unsaturated dibasic acids or anhydrides thereof. The amount of introduced isocyanate terminated adduct can be increased with the increase of amount of hydroxyl groups remaining in the skeletal structure of the fatty acid-modified polyester resin since said isocyanate terminated adduct is determined according to the amount of said hydroxyl groups. Polymerizable unsaturations introduced by means of the isocyanate-terminated adduct are originally derived from the vinyl monomer having a hydroxyl group, and the reactivity with vinyl monomers is therefore not restricted as in the case of unsaturated dibasic acid mentioned before. Thus, said unsaturations are capable of effecting the crosslinking reaction with any vinyl monomers capable of reacting with vinyl monomer having a hydroxyl group, and it is therefore made possible to use arbitrary vinyl monomer without any limitations. The amount of introduced polymerizable unsaturations can be easily controlled since it is determined by the amount of free hydroxyl groups made remaining in the skeletal structure of the fatty acid-modified polyester resin. Consequently, the hardening property can be easily controlled according to the purpose of use of the product.

Additionally the surface hardening property of the composition can be significantly improved according to the present invention since the fatty acid-modified vinylated polyester resins utilized therein are modified with fatty acids, drying oils or a mixture thereof and are using a metal salt dryer so that surface hardening property is not affected by oxygen in the air, and also since they contain urethane bonds with superior air drying property. Consequently, the composition obtained according to the present invention shows excellent surface hardening property and smoothness of surface after hardening upon irradiation of light and thus excludes the necessity for adding wax, paraffin etc. as explained before. This improvement removes various operational difficulties and drawbacks associated with the addition of such wax, paraffin etc. and also allows obtaining a surface of excellent smoothness and luster without additional treatment such as polishing or buffing, leading to the significant improvement in the productivity.

The fatty acid-modified vinylated polyester resins employed in the present invention contain urethane bonds and therefore show various excellent properties such as adhesion, chemical resistance, physical properties and hardening property inherent to such urethane bonds.

Also the fatty acid-modified vinylated polyester resins employed in the present invention are modified with fatty acids, and therefore are provided with excellent properties such as weathering resistance, anticorrosiveness, water resistance, bending property, surface drying property etc. inherent to said fatty acids.

The photohardenable fatty acid-modified vinylated polyester resin compositions according to the present invention can be applied to various industrial fields such moulding, injection, laminating, finishing boards, adhesives, paints etc.

The present invention will be further clarified by the following examples, which by no means limit the extent of the present invention.

A. Examples of preparation of fatty acid-modified vinylated polyester resin adapted for use in the composition according to the present invention I. Preparation of fatty acid-modified polyester resin

EXAMPLE 1

199 g of isophthalic acid and 88 g of adipic acid as the saturated dibasic acids and 84 g of neopentyl glycol and 164 g of trimethylol propane as the polyhydric alcohols were placed in a flask equipped with a thermometer, a water separator provided with a fractionator, a nitrogen introducing tube and a stirrer and heated to 140° C in an atmosphere of nitrogen gas. Successively the temperature of the reaction system was gradually elevated from 160° to 220° C for ca. 2 hours. The system became transparent after heating for 1 hour at 220° C; then 112 g of linseed oil fatty acid and hydroquinone as the polymerization inhibitor in an amount of 500 ppm based on the amount of said linseed oil fatty acid were added, and the reaction was continued for 2 hours at 200° C. Then the reaction was switched from fussion process to solvent process by adding 25 g of toluene to the system, and the reaction was continued under dehydration until the acid value reached 15 and the viscosity reached F on Gardner bubble viscometer (measurement of viscosity was carried out after dilution with cellosolve acetate so as to obtain a resin content of 50 weight per cent at 25° C all (viscosity herein was determined in the same manner)]. The fatty acid-modified saturated polyester resin was solid at room temperature, and was changed to solution with a resin content of 50 weight percent by adding methyl methacrylate in order to facilitate handling.

EXAMPLE 2

245 g of isophthalic acid and 110 g of adipic acid as saturated dibasic acids and 68 g of neopentyl glycol and 256 g of trimethylol propane as the polyhydric alcohols, 40 g of high conjugated linoleic acid (having neutralization value of 200 and iodine value of 175, made by Soken Kagaku Kabushiki Kaisha) as fatty acids for modification, and hydroquinone as the polymerization inhibitor in an amount of 300 ppm based on said high conjugated linoleic acid were placed in a flask provided with equipment similar to Example 1, and a fatty acid-modified saturated polyester resin having the acid value of 16 and the viscosity of D–E was obtained according to a procedure similar to that in Example 1. The product thus obtained was made into a solution by adding methyl acrylate so as to obtain a resin content of 50 weight percent.

EXAMPLE 3

37 g of fumaric acid as the unsaturated dibasic acid, 125 g of isophthalic acid and 109 g of adipic acid as the saturated dibasic acids, 105 g of neopentyl glycol and 205 g of trimethylol propane as polyhydric alcohols, 140 g of linseed oil fatty acid as the fatty acid for modification, and hydroquinone as the polymerization inhibitor in an amount of 500 ppm based on said linseed oil fatty acid were placed in a flask provided with equipment similar to Example 1, and a fatty acid-modified unsaturated polyester resin having the acid value of 28 and the viscosity of E–F was obtained according to a procedure similar to that in Example 1. The product thus obtained was further made into a solution (hereinafter referred to as "varnish Y") by means of adding styrene so as to obtain a resin content of 50 weight percent.

II. Preparation of the isocyanate adduct

EXAMPLE 4

174 g of tolylene diisocyanate was placed in a flask equipped with a reflux condenser, a thermometer and a dropping funnel and heated to 60° C. 143 g of 2-hydroxyethyl methacrylate was added dropwise for ca. 2.5 hours. The speed of addition and agitation requires precise control since the reaction is exothermic. After the addition of 2-hydroxethyl methacrylate is completed, the reaction was continued until the isocyanate value reached to 128 which was half of the theoretical value (said reaction required one hour in the present example). The reaction product was solid at room temperature, and was therefore changed to a solution by adding methyl methacrylate so as to obtain a content of isocyanate-terminated adduct of 80 weight per cent.

EXAMPLE 5

163 g of hexamethylene diisocyanate was placed in a flask provided with equipment similar to that in Example 4 and heated to 60° C. Reaction was carried out by dropping 143 g of 2-hydroxethyl methacrylate for cca. 3.0 hours. The reaction was stopped when the isocyanate value reached to 130. The isocyante-terminated adduct obtained in this example was colorless similar to that obtained in Example 4 and used in the following examples without further treatment.

III. Preparation of fatty acid-modified vinylated polyester resin

EXAMPLE 6

925 g of solution of fatty acid-modified saturated polyester resin prepared in Example 1, 208 g of isocyanate-terminated adduct obtained in Example 4, and 2,-6-di-tert-butylhydroxytoluene as the polymerization inhibitor in an amount of 300 ppm based on the total amount of the fatty acid-modified saturated polyester resin and the isocyanate-terminated adduct were mixed and then reacted for 2 hours at 80° C in an atmosphere. The reaction was stopped when the viscosity of the reaction mixture reached to D–E on Gardner bubble viscometer at 25° C. Successively, 143 g of 2-hydroxyethyl methacrylate was added and reacted for 1 hour at 80° to 85° C in order to remove unreacted free isocyanate groups present in the system. As a result there was obtained a solution of the fatty acid-modified vinylated polyester resin thereinafter referred to as "varnish A") applicable to the composition of the present invention.

EXAMPLE 7

925 g of the fatty acid-modified saturated polyester resin prepared in Example 1, 196 g of isocyanate-terminated adduct obtained in Example 5, and 2,6-di-tert-butylhydroxytoluene as the polymerization inhibitor in an amount of 300 ppm based on the total amount of the fatty acid-modified saturated polyester resin and the isocyanate-terminated adduct were mixed and reacted for ca. 4 hours at 60° C. The reaction was stopped when the viscosity reached A. Successively, 171 g of 2-hydroxyethyl methacrylate was added and reacted for 1 hour in order to remove unreacted free isocyanate groups present in the system. As a result there was obtained a solution of the fatty acid-modified vinylated polyester resin (hereinafter referred to as "varnish B") adapted for use in the composition of the present invention.

EXAMPLE 8

925 g of the fatty acid-modified saturated polyester resin prepared in Example 2, 394 g of the isocyanate-terminated adduct obtained in Example 4, and 2,6-di-tert-butylhydroxytoluene as the polymerization inhibitor in an amount of 300 ppm based on the total amount of the fatty acid-modified saturated polyester resin and the isocynate-terminated adduct were mixed and reacted for 2 hours at 80° C in an atmosphere. The reaction was stopped when the viscosity reached to L—M. Successively, 162 g of 2-hydroxyethyl methacrylate was further added and reacted for 1 hour at 80° to 85° C in order to remove unreacted free isocyanate groups contained in the system and 100 g of ethyl acrylate was added. The result obtained was a solution of the fatty acid-modified vinylated polyester resin (hereinafter referred to as "varnish C") adapted for use in the composition of the present invention.

EXAMPLE 9

925 g of the fatty acid-modified saturated polyester resin prepared in Example 2, 339 g of the isocyanate-terminated adduct obtained in Example 5, and 2,6-di-tert-butylhydroxytoluene as the polymerization inhibitor in an amount of 300 ppm based on the total amount of the fatty acid-modified saturated polyester resin and the isocyanate-terminated adduct were mixed and reacted for 2 hours at 80° C in an atmosphere. The reaction was stopped when the viscosity reached to I–J.

Successively, 162 g of 2-hydroxyethyl methacrylate was further added and reacted for 1 hour at 80° to 85° C in order to remove unreacted free isocyanate groups contained in the system and 114 g of ethylacrylate was added. The result obtained was a solution of fatty acid-modified vinylated polyester resin (hereinafter referred to as "varnish D") adapted for use in the composition of the present invention.

EXAMPLE 10

925 g of the fatty acid-modified unsaturated polyester resin prepared in Example 3, 206 g of the isocyanate-terminated adduct obtained in Example 4 and 2,6-di-tert-butylhydroxytoluene as the polymerization inhibitor in an amount of 300 ppm based on the total amount of the fatty acid-modified unsaturated polyester resin and the isocynate-terminated adduct were mixed and reacted for 2 hours at 80° C in an atmosphere. The reaction was stopped when the viscosity reached R. successively, 141 g of 2-hydroxyethyl methacrylate was added and reacted for 1 hour at 80° to 85° C in order to remove unreacted free isocyanate groups present in the system. The result obtained was a solution of fatty acidmodified vinylated unsaturated polyester resin (hereinafter referred to as "varnish E") adapted for use in the composition of the present invention.

EXAMPLE 11

925 g of solution of fatty acid-modified unsaturated polyester resin prepared in Example 3, 162 g of isocyanate-terminated adduct obtained in Example 5 and 2,6-di-tert-butylhydroxytoluene as the polymerization inhibitor in an amount of 300 ppm based on the total amount of the fatty acid-modified unsaturated polyester resin and the isocyanate-terminated adduct were mixed and reacted for 2 hours at 80° C in an atmosphere. The reaction was stopped when the viscosity reached to A+. Successively, 141 g of 2-hydroxyethyl methacrylate was added and reacted for 1 hour at 80° to 85° C in order to remove unreacted free isocyanate groups present in the system. The result obtained was a solution of fatty acid-modified vinylated polyester resin (hereinafter referred to as "varnish F") adapted for use in the composition of the present invention.

B. Examples regarding the compositions obtained according to the present invention Solutions, 100 parts, of the fatty acid-modified vinylated polyester resins obtained in the Examples 6 to 11 were mixed with photosensitizer, metal salt dryer etc. as indicated in the following table, which also summarizes the performances obtained.

(*5) A test piece obtained by coating and hardening of a sample on a polished soft-steel plate according to (*3) was tested at 20°C according to JIS-K-5652(5.15). (*6) Coating of a test piece obtained by coating and hardening of a sample on a polished soft-steel plate according to (*3) was cut with a sharp knift to the steel plate so as to form a grid-like pattern containing 100 squares of 1 mm, and a scotch tape was tightly applied thereon. Said adhesive tape was vigorously stripped off at 20°C in a direction perpendicular to said coating, and the number of remaining squares was counted. (*7) A test piece obtained by coating and hardening of a sample on a polished soft-steel plate according to (*3) was dipped in 5 % aqueous solution of NaOH

| Sample | Sample composition (*1) | | | | | | Test result (*3) | | | | | | |
|---|---|---|---|---|---|---|---|---|---|---|---|---|---|
| | Varnish | | Photo-sensitizer | | Metal salt dryer | | (*4) Gel fraction | (*5) Pencil hardness | (*6) Adhesion | (*7) Chemical resistance | (*8) Water resistance | (*9) Impact resistance (500g x ½") | (*10) Erichsen test (mm) |
| | Name | Amount | Name | Amount | Name | Amount (*2) | | | | | | | |
| Example 1 | Varnish A | 100 | Benzoin ethyl ether | 0.2 | Co-naphthenate 0.05 Pb-naphthenate 0.45 | 0.5 | 90 | 3H | 100 | ⊙ | ⊚ | 40cm | 5.0 |
| " 2 | " B | 100 | " | 0.2 | Co-naphthenate 0.025 Pb-naphthenate 0.25 | 0.275 | 92 | 2H | 100 | ⊚ | ⊚ | 50cm | 6.5 |
| " 3 | " C | 100 | Benzoin | 0.5 | Co-naphthenate 0.025 Pb-naphthenate 0.25 | 0.275 | 90 | 2H | 100 | ⊚ | ⊚ | 45cm | 6.0 |
| " 4 | " D | 100 | " | 0.5 | Co-naphthenate | 0.2 | 92 | 2H | 100 | ⊚ | ⊚ | 45cm | 6.5 |
| " 5 | " E | 100 | Benzoin Methyl ether | 0.1 | Co-naphthenate 0.05 Pb-naphthenate 0.45 | 0.5 | 94 | 3H | 95 | ⊚ | ⊚ | 30cm | 6.0 |
| " 6 | " F | 100 | " | 0.2 | Co-naphthenate | 0.2 | 92 | 3H | 95 | ⊚ | ⊚ | 45cm | 4.5 |
| Reference example 1 | " Y | 100 | " | 0.2 | Cobalt naphthenate | 1.0 | 61 | 6B | 0 | × | × | 10cm | 2.0 |
| " 2 | " (*11) Z | 100 | " | 0.2 | - | - | 60 | 6B | 0 | × | × | 5cm | 2.0 |

Notes:
(*1) Amounts of components in each sample are given in parts by weight.
(*2) The amount of metal salt dryer indicates the amount of xylene solution containing metal salt dryer in such an amount as to correspond to metal amount of 5 weight percent.
(*3) The test piece was prepared by applying a sample on a clean glass plate of 3 mm thickness or on a polished soft-steel plate of 0.5 mm thickness so as to obtain a coating thickness of 40 to 50 microns and hardening the coating by means of irradiation for 5 minutes with a high-pressure mercury lamp of 2 KW at 15 cm distant from the coating.
(*4) The gel fraction was determined by stripping the hardened coating obtained by coating and hardened according to (*3) on a glass plate, dipping thus stripped coating in acetone; exracting the acetone-soluble components with acetone from said coating for 48 hours at the boiling point of acetone, drying the acetone-insoluble components under reduced pressure thereby removing volatile components and applying the weight changes to the following formula:

Gel fraction (%) = (weight of coating after acetone extraction)/(weight of coating before acetone extraction) × 100 at 20°C for 72 hours, and observation was made thereafter as to the state of coating. The Mark in the table indicates that the coating was completely free from blister, white spot or other abnormalities. The mark x in the reference sample 1 indicates the blistering of coating over the whole surface, while that in the reference sample 2 indicates that the coating was dissolved. (*8) The coating on a test piece obtained by coating and hardening of a sample on a polished soft-steel plate according to (*3) was observed after dipping for 72 hours in water of 20°C. The Mark in the table indicates that the coating was completely free from blister, whitening or other abnormalities. The mark x in the reference sample 1 indicates the formation of blister and whitening as well as loss of luster, while that in the reference sample 2 shows the formation of blister and whitening. (*9) Impact resistance After mechanical shock was given on to coated surface of the test panel by Parlin Du Pont Impact Tester under conditions of 1/2 inch, 500 g. The results are shown by the undamaged height (cm). (*10) Erichsen Test The test panel was placed with the coated surface towards the die and the sperical punch was brought into contact with the reverse of the panel. The punch was forced into the die until cracking first occured. This point was shown as the "Erichsen Depth" (mm). (*11) The reference sample 2 was obtained by forming an unsaturated polyester resin consisting of 5.0 moles of phthalic anhydride, 5.0 moles of maleic anhydride, 6.0 moles of neopentyl glycol and 4.5 moles of ethylene glycol according to a conventional process, and diluting said resin as the crosslinkable monomer with styrene so as to obtain a resin content of 50 % (herein referred to as "varnish Z".

What is claimed is:

1. A photohardenable fatty acid-modified vinylated polyester resin composition comprising
   A. from about 10 to about 60 percent by weight of a vinyl monomer selected from the group consisting of
      1. styrene and its derivatives

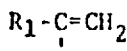

in which $R_1$ is hydrogen or methyl group and $R_2$ is hydrogen, methyl group or chlorine
      2. acrylic or methacrylic monomers $$CH_2=C-COOR_4 \atop R_3$$

in which $R_3$ is hydrogen or methyl group and $R_4$ is hydrogen, alkyl group having one to 16 carbon atoms, hydroxyalkyl group having two to three carbon atoms, glycidyl group and dialkylamino alkyl group

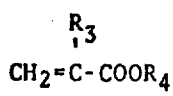

$R_5$ is alkylene group having one to two carbon atoms and $R_6$ is alkyl group having one to two carbon atoms)
      3. vinylidene monomer $$CH_2=C{R_7 \atop R_8}$$

in which $R_7$ is hydrogen or methyl group and $R_8$ is nitrile group, carbamoyl group, N-methylolcarbamoyl group, alkylether-N-methylolcarbamoyl group (—CONHCH$_2$OR$_9$; $R_9$ is alkyl group having one to four carbon atoms) or acetoxy group, or a mixture thereof;
   B. from about 40 to about 90 percent by weight of a fatty acid-modified vinylated polyester resin selected from the group consisting of
      1. a fatty acid-modified vinylated polyester resin prepared by reacting 1.0 mole of a diisocyanate selected from the group consisting of toluene diisocyanate and hexamethylene diisocyanate with 0.7 to 1.3 moles of 2-hydroxyethylmethacrylate to provide an isocyante-terminated adduct and then reacting 0.4 to 1.2 moles of said isocyanate-terminated adduct per mole of a pendant hydroxyl of a linseed oil fatty acid or highly conjugated linoleic acid modified polyester resin of ingredients comprising isophthalic acid, neopentyl glycol, trimethylolpropane, and adipic acid, and
      2. a fatty acid-modified vinylated polyester resin prepared by reacting 1.0 mole of a diisocyante selected from the group consisting of toluene diisocyanate and hexamethylene diisocyanate with 0.7 to 1.3 moles of 2-hydroxyethylmethacrylate to provide an isocyanate-terminated adduct and then reacting 0.4 to 1.2 moles of said isocyanate-terminated adduct per mole of pendant hydroxyl of a linseed oil fatty acid-modified polyester resin of ingredients comprising isophthalic acid, neopentyl glycol, trimethylolpropane and fumaric acid,
   said fatty acid-modified vinylated polyester resin having from 0.2 to 3.0 units of alpha, beta-olefinic unsaturation per 1,000 units molecular weight of said resin, a number average molecular weight of about 800 to about 5,000, a fatty acid content of about 5 to 35 percent by weight based on the total weight of the fatty acid and unmodified polyester resin, a number of hydroxyl groups of about 0.5 to 3.0 units per 1,000 units molecular weight, and an acid value of about 5 to about 30,
   C. metal salt-dryer selected from cobalt, manganese, calcium, zinc, iron, zirconium, lead or copper salt in amount of about 0.1 to 2.0 percent by weight based on the total amount of the fatty acid-modified vinylated polyester resin and vinyl monomer, and
   D. a photosensitizer of about 0.05 to about 10 percent by weight based on the total amount of the fatty acid-modified vinylated polyester resin and vinyl monomer in which said photosensitizer is one selected from the group consisting of the following formulas:
      1. benzoin and its derivatives

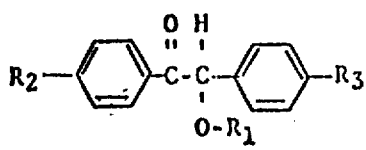

in which $R_1$ is hydrogen, alkyl group having from one to 18 carbon atoms, methylcyclohexyl group, benzyl group or ethylether derivative groups represented by the general formula

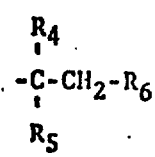

in which $R_4$ or $R_5$ is hydrogen or methyl group and $R_6$ is alkoxy group having one to four carbon atoms, acetyl group having one to four carbon atoms or alkoxyalkyl group having one to six carbon atoms, 2. azo compounds $$R_7—N=N—R_8$$

in which $R_7$ is

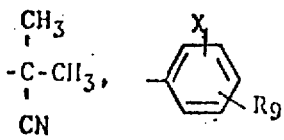

($R_9$ is hydrogen, chlorine or alkyl group having one to three carbon atoms and X is hydrogen, chlorine or bromine),

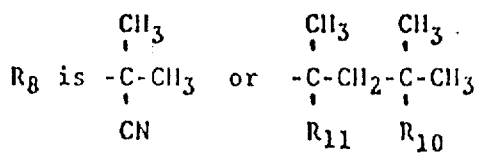

($R_{10}$ is hydrogen, methyl group or methoxy group, and $R_{11}$ is hydrogen or nitrilo group), and 3. diphenyl disulfide and its derivatives

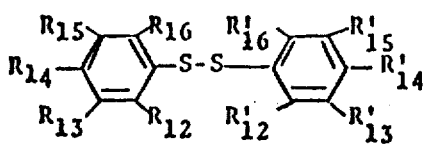

in which $R_{12}$ and $R_{12}'$ are hydrogen, methyl group or chlorine, $R_{13}$ and $R_{13}'$ are hydrogen or methyl group, $R_{14}$ and $R_{14}'$ are hydrogen, chlorine, alkyl group having one to four carbon atoms or methoxy group, $R_{15}$ and $R_{15}'$ are hydrogen, chlorine or methyl group, and $R_{16}$ and $R_{16}'$ are hydrogen or methyl group.

2. A photohardenable fatty acid-modified vinylated polyester resin composition according to claim 1, in which said styrene and its derivatives are styrene, vinyl toluene, 2-methyl styrene and chlorostyrene.

3. A photohardenable fatty acid-modified vinylated polyester resin composition according to claim 1, in which said acrylic or methacrylic monomers are acrylic acid, methacrylic acid, methacrylic acid, methyl acrylate, methyl methacrylate, butyl acrylate, butyl methacrylate, 2-ethyl hexyl acrylate, 2-ethyl hexyl methacrylate, octyl acrylate, octyl methacrylate, lauryl methacrylate, 2-hydroxyethyl acrylate, 2-hydroxyethyl methacrylate, 2-hydroxypropyl acrylate, 2-hydroxypropyl methacrylate, glycidyl acrylate, glycidyl methacrylate, dimethylaminomethyl acrylate, dimethylaminoethyl methacrylate, diethylaminoethyl acrylate and diethylaminoethyl methacrylate.

4. A photohardenable fatty acid-modified vinylated polyester resin composition according to claim 1, in which said vinylidene compounds are acrylonitrile, methacrylonitrile, acrylamide, methacrylamide, ethylether-N-methylol acrylamide, ethylether-N-methylol methacrylamide, butylether-N-methylol acrylamide, propylether-N-methylol methacrylamide and vinyl acetate.

5. A photohardenable fatty acid-modified vinylated polyester resin composition according to claim 1, in which said metal salt dryer is at least one selected from a group consisting of metal salt dryer cobalt, lead, manganese, calcium, zinc, iron, zirconium, or copper salt of naphthanic acid, octoinic acid, linseed oil fatty acid, soybean oil fatty acid or tor oil fatty acid in an amount of 0.1 to 2.0 weight per cent as metal based on the total amount of the fatty acid-modified vinylated polyester resin and vinyl monomers.

6. A photohardenable fatty acid-modified vinylated polyester resin composition according to claim 1, in which said benzoin and its derivatives are benzoin, benzoin methyl ether, benzoin ethyl ether, benzoin isopropyl ether, benzoin butyl ether, benzoin 2-ethyl hexyl ether, benzoin n-octyl ether, benzoin isoactyl ether, benzoin n-nonyl ether, benzoin n-decyl ether, benzoin lauryl ether, benzoin cetyl ether, benzoin 2-methyl cyclohexyl ether, benzoin benzyl ether, 4-methoxy benzoin, 4-dimethylamino benzoin, anisoin, anisoin methyl ether, anisoin ethyl ether, anisoin iso-propyl ether, 4-methoxy benzoin methyl ether, 4-methoxy benzoin ethyl ether, 4-methoxy benzoin isopropyl ether, 4-dimethyl amino benzoin methyl ether, 4-dimethyl amino benzoin ethyl ether, 4-dimethyl amino benzoin isopropyl ether, benzoin-2-methoxy ethyl ether, benzoin-2-ethoxy ethyl ether, benzoin-2-(2-ethoxy) ethoxy ethyl, benzoin dimethyl acetyl methyl ether, benzoin-2-(2-methoxy ethoxy) ethyl ether and benzoin-2-(2-buthoxy ethoxy)-ethyl ether.

7. A photohardenable fatty acid-modified vinylated polyester resin composition according to claim 1, in which said azo compounds are 2,2'-bisisobutyronitrile, 2-phenylazo-2,4,4-trimethyl valeronitrile, 2-phenylazo-2,4-dimethyl valeronitrile, 2-phenylazo-2,4-dimethyl-4-methoxy valeronitrile, 2-(tolylazo)-2,4-dimethyl valeronitrile, 2-(octyl phenylazo)-2,4-dimethyl valeronitrile, 2-(chloro phenylazo)-2,4-dimethyl valeronitrile, 2-(dichloro phenylazo)-2,4-dimethyl valeronitrile, 2-(ethyl monochlorophenyl)-2,4-dimethyl valeronitrile, 2-(hexyl monobromo phenylazo)-2,4-dimethyl valeronitrile, 2-(phenylazo)-2,4-dimethyl-4-methoxy valeronitrile, 2-(tolylazo)-2,4-dimethyl-4-methoxy valeronitrile, 2-(hexyl phenylazo)-2,4-dimethyl-4-methoxy valeronitrile, 2-(heptylphenylazo)-2,4-dimethyl-4-methoxy valeronitrile, 2-(monochlorophenylazo)-2,4-dimethyl-4-methoxy valeronitrile, 2-(dichlorophnylazo)-2,4-dimethyl-4-methoxy valeronitrile, 2-(hexyl monobromophenylazo)-2,4-dimethyl-4-methoxy valeronitrile, 2-(phenylazo)-2,4-dimethyl-4-propoxy valeronitrile, 2-(phenylazo)-2,4-dimethyl-4-butoxy valeronitrile, 2-(chlorophenylazo)-2,4-dimethyl-4-butoxy valeronitrile, 2-(tolylazo)-2,4-dimethyl-4-butoxy valeronitrile, 2-(hexylphenylazo)-2,4-dimethyl-4-butoxy valeronitrile, 2-(dichlorophenylazo)-2,4-dimethyl-4 -butoxy valeronitrile and 2-(propylmonochlorophenylazo)-2,4-dimethyl-4-butoxy valeronitrile.

8. A photohardenable fatty acid-modified vinylated polyester resin composition according to claim 1, in which said diphenyl disulfide and its derivatives are diphenyl disulfide, 4,4'-dimethyl diphenyl disulfide, 2,2',5,5'-tetramethyl diphenyl disulfide, 2,2',4,4'-tetramethyl diphenyl disulfide, 3,3',4,4'-tetramethyl diphenyl disulfide, 4,4'-di-tert-butyl diphenyl disulfide, 2,2',6,6'-tetramethyl-4,4'-di-tert-butyl-diphenyl disulfide, 4 '-dichloro-diphenyl disulfide, 2,2',4,4',5,5'-hexachloro-diphenyl disulfide and 4,4'-dimethoxy-diphenyl disulfide.

* * * * *